(No Model.)
W. STOREY.
LAWN MOWER.
No. 448,866. Patented Mar. 24, 1891.
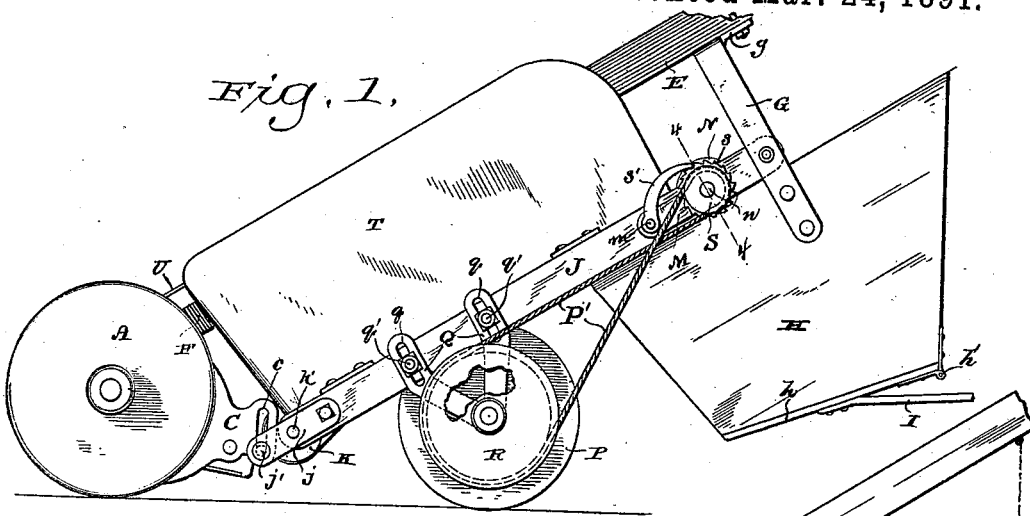
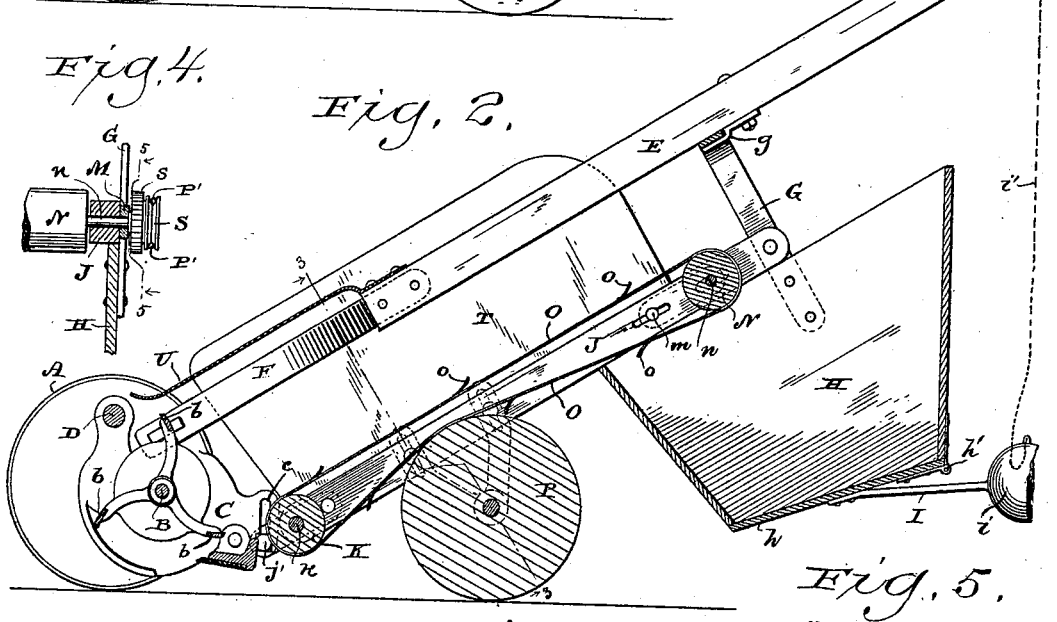
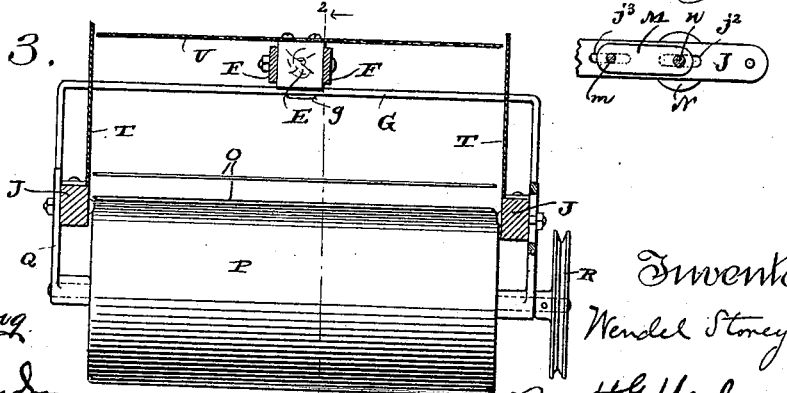
Witnesses
Geo. W. Young
Jno. L. Condron
Inventor
Wendel Storey
By H. G. Underwood
Attorney

UNITED STATES PATENT OFFICE.

WENDEL STOREY, OF GRAFTON, WISCONSIN.

LAWN-MOWER.

SPECIFICATION forming part of Letters Patent No. 448,866, dated March 24, 1891.

Application filed August 18, 1890. Serial No. 362,323. (No model.)

*To all whom it may concern:*

Be it known that I, WENDEL STOREY, of Grafton, in the county of Ozaukee, and in the State of Wisconsin, have invented certain new and useful Improvements in Lawn-Mowers; and I do hereby declare that the following is a full, clear, and exact description thereof.

My invention relates to attachments to lawn-mowers for receiving the grass cut by the mower, and also for conveying the cut grass from the cutters; and my invention consists in certain peculiar and novel features of construction and arrangement, as hereinafter described, and pointed out in the appended claims.

In the drawings, Figure 1 is a side elevation of a lawn-mower with my improvements applied thereto. Fig. 2 is a central longitudinal section of the same on the line 2 2 of Fig. 3. Fig. 3 is a transverse vertical section of the same on the line 3 3 of Fig. 2. Fig. 4 is a transverse vertical section of the same on the line 4 4 of Fig. 1. Fig. 5 is a detail hereinafter described.

The objects of my invention are to provide a receptacle for the grass cut by the mower, which shall be properly located to receive the cut grass, and from which the grass can be readily discharged without detaching the receptacle from the machine; also, to provide a carrier or elevator which shall deliver the cut grass to the receptacle without increasing the tractional resistance of the machine, and, finally, to prevent the cutters from tossing the cut grass upward and throwing it outward in front of the machine. These results I attain by virtue of the construction which I will now proceed to describe.

Referring to the drawings, A A designate the main rollers, which are internally toothed to actuate the gear-pinions of the cutter-shaft B. This gearing is not shown, because it is a well-known expedient in this class of machines. The main rollers are journaled in customary manner upon the outer sides of the usual bearing-plates C, and these plates are, as usual, connected by the cross-rod D.

$b$ designates the cutters, which are of any suitable or preferred form, and which are shown as connected to the cutter-shaft so as to revolve therewith.

E designates the handle of the machine, the lower or front end of which is connected, preferably by a fork F, to the bearing-plates C in any suitable manner. These parts are shown and thus described in order that the parts comprising an embodiment of my present invention may be understood in their relation to a lawn mowing machine.

G designates an inverted-U-shaped hanger, which is pendent from the under side of the handle E, said hanger being preferably removably secured midway of its length to said handle by a strap $g$, bolted or otherwise suitably secured to the underside of said handle.

H designates the receptacle for cut grass, which may be either of the flaring rectangular form shown or of any other suitable form. At its opposite sides or ends this receptacle is riveted or similarly secured to the lower ends of hanger G, as shown. The bottom $h$ of this receptacle is connected, preferably, to the rear side thereof by a hinge $h'$, and said bottom is normally retained in close position by a weight $i$ upon the outer end of an arm I, which extends beyond the hinge, and the opposite end of which is secured to the under side of the bottom. A chain or other flexible connection $i'$ preferably connects the weight with the handle for convenience in raising the weight when opening the bottom for the purpose of emptying the receptacle. Thus it will be seen that there is no necessity, as heretofore, for detaching or in any way moving the receptacle when discharging its load.

J J designate two bars, the front ends of which are each bolted or otherwise similarly secured to a link $j$, the front end of which is secured to the adjacent bearing-plate C by a bolt $j'$, extending through a slot or opening $c$ in the rear part of said plate. A shaft $k$ extends through the overlapping ends of the bars J and links $j$, and this shaft carries a roller K, for a purpose to be presently described. These bars J extend parallel with the handle E, but on a lower plane than the latter, and are connected at their rear ends by bolts or equivalent devices to the arms of the hanger G. The upper end of each of these bars J is formed with two elongated slots $j^2 j^3$, through the latter of which extends a set-bolt $m$, which also extends through the front end of the adjacent one of the two plates M. A roll N is the companion roll to the roll K, above referred to, and the shaft $n$ of said roll N passes through the rear ends of said plates M and also through the slots $j^2$ of the bars J. An endless apron O runs over the rolls K N, and is provided on its outer surface with lips $o$, as shown.

It is to be understood that the plates M and set-bolts $m$, together with the slots $j^2 j^3$, serve as the means for regulating the tension of the belt O. This belt is actuated by a roller P, the axles of which are journaled in a pair of V-shaped standards Q, located at opposite sides of the machine. The upper ends of the arms of these standards are formed with elongated slots $q$, through which extend set-bolts $q'$, extending outwardly from the bars J. By this arrangement the roll P and bars J are relatively made adjustable to vary the inclination of the handle E. A pulley-disk R is mounted upon one end of the shaft of roll P, and an endless rope, cord, or similar connection P' is run over said pulley, then crossed, and run over a pulley S on the shaft of the roll N. Adjacent to this pulley S is a ratchet-disk $s$, with which a pawl $s'$ engages, said pawl being pivoted either upon the corresponding set-bolt $m$ or upon an adjacent part of the plate M, and a reverse movement of the apron O being thus prevented when the machine is moved toward the rear, the belt P' slipping on said pulley at such a time.

In order to prevent the cut grass from escaping over the edges of the elevator belt or apron O, side pieces T, preferably of sheet metal, are secured to the bars J and rise vertically therefrom, and in order to prevent the cut grass from being tossed upward and thrown forward by the cutters, a shield U, preferably also of sheet metal, is secured at its inner edge to the front part of the handle E and extends well forward above said cutters.

From the above description it will be seen that I have produced attachments which do not materially increase either the weight or the tractional resistance of lawn-mowers and which greatly facilitate their effective action in every way.

Having thus described my invention, what I claim as new therein, and desire to secure by Letters Patent, is—

1. An improved attachment for lawn-mowers, comprising a receptacle for cut grass, provided with a movable bottom hinged at its rear edge to the lower edge of the back wall of the receptacle and provided with a rearwardly-extending weighted arm serving to retain the bottom normally in upper closed position, substantially as set forth.

2. An improved lawn-mower comprising rearwardly-extending handle, a traction-actuated cutting mechanism carried at the front end of the handle, side bars located beneath the handle and connected at their front ends to the frames of the cutting apparatus, a roller mounted in stationary bearings in the front ends of said side bars, another roller mounted in bearings at the rear ends of said bars adjustable toward or from the roller at the front of the bars, an apron leading over said rollers, a traction-roller located beneath said side bars, and a belt extending around a pulley on the axle of said traction-roller and also around a pulley on the movable roller, substantially as set forth.

3. An improved lawn-mower comprising a rearwardly-extending handle, a traction-actuated cutting mechanism carried at the front end of said handle, side bars mounted beneath the handle, rollers journaled in the front and rear ends of said side bars, an endless apron extending around said rollers, a traction-roller adjustably journaled beneath said side bars, a pawl-and-ratchet mechanism operatively connected to the upper apron-roller, and a belt connecting the axle of said apron-roller with the axle of the traction-roller, substantially as set forth.

In testimony that I claim the foregoing I have hereunto set my hand, at Grafton, in the county of Ozaukee and State of Wisconsin, in the presence of two witnesses.

WENDEL STOREY.

Witnesses:
JOHN DONOVAN,
ANDREW BACK.